United States Patent [19]

Murai et al.

[11] 4,439,537
[45] Mar. 27, 1984

[54] PROCESS FOR THE PREPARATION OF CATALYST COMPONENT FOR THE POLYMERIZATION OF OLEFINS

[75] Inventors: Atsushi Murai, Kanagawa; Minoru Terano, Chigasaki; Yoshikazu Hitosugi; Kouhei Kimura, both of Kanagawa; Masuo Inoue; Katsuyoshi Miyoshi, both of Chigasaki, all of Japan

[73] Assignee: Toho Titanium Co., Ltd., Tokyo, Japan

[21] Appl. No.: 390,858

[22] Filed: Jun. 22, 1982

[30] Foreign Application Priority Data

| Jun. 29, 1981 | [JP] | Japan | 56-99674 |
| Oct. 2, 1981 | [JP] | Japan | 56-156162 |
| Dec. 18, 1981 | [JP] | Japan | 56-203589 |
| Dec. 26, 1981 | [JP] | Japan | 56-209556 |
| Dec. 26, 1981 | [JP] | Japan | 56-209557 |

[51] Int. Cl.$^3$ .................................. C08F 4/64
[52] U.S. Cl. ........................... 502/105; 502/107; 502/111; 502/104; 502/133; 502/125; 502/126; 502/127; 502/123; 502/121; 526/124
[58] Field of Search ........................ 252/429 B

[56] References Cited

U.S. PATENT DOCUMENTS

| 3,642,746 | 2/1972 | Kashiwa et al. | 252/429 B X |
| 4,143,223 | 3/1979 | Toyota et al. | 252/429 B X |
| 4,170,568 | 10/1979 | Kirkwood | 252/429 B X |
| 4,319,010 | 3/1982 | van den Berg | 252/429 B X |
| 4,364,853 | 12/1982 | Mink et al. | 252/429 B |

FOREIGN PATENT DOCUMENTS

| 49-120980 | 11/1974 | Japan . |
| 50-126590 | 10/1975 | Japan . |
| 1258984 | 9/1969 | United Kingdom . |
| 1315768 | 10/1971 | United Kingdom . |
| 1465749 | 4/1974 | United Kingdom . |
| 1571491 | 3/1976 | United Kingdom . |
| 1554340 | 6/1977 | United Kingdom . |
| 1554248 | 9/1977 | United Kingdom . |
| 1569228 | 11/1977 | United Kingdom . |

Primary Examiner—Patrick Garvin
Attorney, Agent, or Firm—Fisher, Christen & Sabol

[57] ABSTRACT

A process for the preparation of the former catalyst component of a catalyst for the polymerization of olefins composed of a titanium-based catalyst component and an organo aluminium compound is disclosed.

The former catalyst component can readily be produced by contacting (a) a fatty acid salt of magnesium, (b) an electron donor compound and (c) a titanium halide.

In the polymerization of olefins by use of the former catalyst component, both the amount of catalyst residues in the produced polymer and halogen content therein are greatly reduced with high polymerization activity per unit weight of the former catalyst component and with high yield of stereoregular polymer.

25 Claims, No Drawings

PROCESS FOR THE PREPARATION OF CATALYST COMPONENT FOR THE POLYMERIZATION OF OLEFINS

BACKGROUND OF THE INVENTION (1) Field of the Invention

This invention relates to a process for the preparation of a titanium-based catalyst component (hereinafter referred to simply as a catalyst component) of a catalyst for use in the polymerization of olefins composed of the titanium-based catalyst component and an organo aluminium compound, where polymerization includes homopolymerization and copolymerization thereof.

That is, this invention relates to a process for the preparation of a catalyst component having such a high activity that when applied to the polymerization of olefins it serves to show a high activity, and stereoregular polymer can be obtained in high yield, and more particularly relates to a process for the preparation of a catalyst component, which comprises contacting a fatty acid salt of magnesium, an electron donor compound and a titanium halide of the general formula: $TiX_4$, wherein X represents a halogen atom.

(2) Description of the Prior Art

A titanium halide is well known in the art as a catalyst component for use in the polymerization of olefins. However, in the polymerization with the titanium halide known as the conventional catalyst component, the yield of polymer per unit weight of the catalyst component or of titanium moiety in the catalyst component (hereinafter referred to simply as a polymerization activity per unit weight of the catalyst component or of titanium) is so low that the so-called deashing process for subsequently removing catalyst residues from the produced polymer is indispensable in order to obtain an industrially applicable polymer. In the deashing process, alcohols or chelating agents are used in large amounts, so that the deashing process needs an apparatus for recovery thereof as well as the deashing apparatus itself, and consequently has many problems accompanying therewith relative to resources, energy, and the like. Thus, the deashing process raises great problems to be solved urgently in the art. A number of studies and suggestions have been made for enhancing the polymerization activity per unit weight of titanium in the catalyst component, so that the complicated deashing process may be dispensed with.

Especially as a recent tendency, a large number of suggestions have been made such that the polymerization activity per unit weight of titanium in the catalyst component is remarkably enhanced in the polymerization of olefins with a catalyst component prepared by supporting a transition-metal compound as an active ingredient such as a titanium halide on a carrier material so that the active ingredient may act effectively.

Japanese Patent Laid-open Publication No. 126590/'75, for example, discloses a process for the preparation of a catalyst component, in which a magnesium halide as a carrier is brought into contact with an aromatic carboxylic acid ester by a mechanical means to form a solid reaction product, and the solid reaction product thus obtained is brought into contact with titanium tetrachloride in the liquid phase to obtain the catalyst component.

However, the prior art employing magnesium chloride as the carrier as described above, has such a disadvantage that the chlorine moiety contained in the magnesium chloride conventionally used as the carrier has an adverse effect on the produced polymer, resulting in leaving problems to be solved such as requirements for such a high activity as to be substantially free from the adverse effect due to the chlorine moiety, or as requirements for controlling a concentration of the magnesium chloride itself at a sufficiently low level.

Thus, attempts have been made on the use of other substances effective as a carrier than magnesium chloride. No attempts as above, however, have succeeded in providing such a process as to be satisfactory for requirements in the art where both high polymerization activity per unit weight of the catalyst component and high yield of stereoregular polymer are needed.

As an example of the above attempts, Japanese Patent Laid-open Publication No. 120980/'74 discloses a process for the preparation of catalyst component for the polymerization of olefins, which comprises reacting magnesium acetate with an aluminium compound to form a reaction product followed by contacting the reaction product with a titanium tetrahalide to obtain a catalyst component, resulting in being unsuitable particularly for the polymerization of propylene, in which high yield of stereoregular polymer is required, and to which this invention is directed, as shown in a comparative example hereinafter illustrated.

SUMMARY OF THE INVENTION

An object of this invention is to provide an improved process for the preparation of catalyst component for the polymerization of olefins which is capable of greatly reducing both the amount of catalyst residues in the produced polymer and halogen content therein with high polymerization activity per unit weight of the catalyst component and with high yield of stereoregular polymer.

Another object of this invention is to provide a process for the preparation of catalyst component for the polymerization of olefins which is capable of readily producing the catalyst component on an industrial scale.

In accordance with this invention, there is firstly provided a process for the preparation of catalyst component for the polymerization of olefins which comprises contacting with each other (a) a fatty acid salt of magnesium, (b) an electron donor compound and (c) a titanium halide of the general formula: $TiX_4$, wherein X represents a halogen atom, said three ingredients (a), (b) and (c) being copulverized simultaneously in the absence of any solvent, or said fatty acid salt of magnesium being copulverized with said electron donor compound or with said titanium halide in the absence of any solvent to form a copulverization product, said copulverization product then being brought into contact with said titanium halide or with said electron donor compound respectively, said copulverization product formed by the copulverization of the fatty acid salt of magnesium with the electron donor compound forming essentially a solid copulverization product.

In accordance with this invention, there is secondly provided a process for the preparation of catalyst component for the polymerization of olefins which comprises contacting (a) a fatty acid salt of magnesium, (b) an electron donor compound and (c) a titanium halide of the general formula: $TiX_4$, wherein X represents a halogen atom, said three ingredients (a), (b) and (c) being mixed simultaneously in the presence of an organic solvent, or any two ingredients selected from said three ingredients (a), (b) and (c) being mixed with each other in the presence of an organic solvent to form a mixed product, said mixed product then being mixed directly or after removing the solvent therefrom with the residual ingredient, said mixed product formed by mixing the fatty acid salt of magnesium with the electron donor compound forming essentially a solid mixed product by removing the solvent therefrom or forming essentially a suspension.

In accordance with this invention, there is thirdly provided a process for the preparation of catalyst component for the polymerization of olefins which comprises contacting (a) a fatty acid salt of magnesium, (b) an electron donor compound and (c) a titanium halide of the general formula: $TiX_4$, wherein X represents a halogen atom, said three ingredients (a), (b) and (c) being mixed simultaneously in the absence of any solvent, or any two ingredients selected from said three ingredients (a), (b) and (c) being mixed with each other in the absence of any solvent to form a mixed product, said mixed product then being mixed with the residual ingredient, said mixed product formed by mixing the fatty acid salt of magnesium with the electron donor compound forming essentially a solid mixed product.

DETAILED DESCRIPTION OF THE PREFERRED EMBODIMENTS

Examples of the fatty acid salt of magnesium used in the present invention include magnesium palmitate, magnesium stearate, magnesium behenate, magnesium acrylate, magnesium adipate, magnesium acetylene, dicarboxylate, magnesium acetoacetate, magnesium azelate, magnesium citrate, magnesium glyoxylate, magnesium glutarate, magnesium crotonate, magnesium succinate, magnesium isovalerate, magnesium isobutyrate, magnesium octanoate, magnesium valerate, magnesium decanoate, magnesium nonanoate, magnesium dococenoate, magnesium undecenoate, magnesium elaidate, magnesium linoleate, magnesium hexanoate, magnesium heptoate, magnesium myristate, magnesium laurate, magnesium butyrate, magnesium oxalate, magnesium tartrate, magnesium suberate, magnesium sebacate, magnesium sorbate, magnesium tetrolate, magnesium hydroacrylate, magnesium pimelate, magnesium pyruvate, magnesium fumarate, magnesium propiolate, magnesium maleate, magnesium malonaldehydate, magnesium malonate, and the like, preferably including saturated fatty acid salt of magnesium, more preferably magnesium stearate, magnesium octanoate, magnesium decanoate, and magnesium laurate.

The fatty acid salt of magnesium is employed preferably in such a state that the moisture contained therein has been removed therefrom to be reduced to a minimum.

The electron donor compound used in the present invention is selected from organic compounds which contain at least one atom selected from oxygen, nitrogen, sulfur, and phosphorus atoms, for example, ethers, alcohols, esters, ketones, amines, phosphines, phosphine amides, and the like. Specific examples of the electron donor compound include aliphatic ethers such as diethyl ether, aromatic ethers such as anisole, aliphatic carboxylic acid esters such as ethyl acetate and methyl methacrylate, aromatic carboxylic acid esters such as ethyl benzoate, ethyl toluate, and ethyl anisate, ketones such as acetone, phosphines such as triphenyl phosphine, phosphine amides such as hexaphosphine amide, and the like, or mixtures thereof, preferably including aromatic carboxylic acid esters, more preferably ethyl benzoate, ethyl p-anisate, and ethyl p-toluate.

Examples of the titanium halide represented by the general formula $TiX_4$ where X is a halogen atom, include titanium tetrachloride, titanium tetrabromide, titanium tetraiodide, and the like, the titanium tetrachloride being preferred. The titanium halide may be used in the form of a complex thereof with the electron donor compound.

The amount to be used of the ingredients for the preparation of the catalyst component is not specifically limited unless it has adverse effects on the performance of the catalyst component formed therefrom, but the electron donor compound is used normally in an amount of from 0.1 to 5 moles, preferably from 0.3 to 2 moles, and the titanium halide is used normally in an amount more than 0.01 mole, preferably more than one mole per mole of the fatty acid salt of magnesium respectively.

In the first and second processes provided according to the present invention, two ingredients selected as above may be of the fatty acid salt of magnesium and the electron donor compound, the electron donor compound and the titanium halide, or of the titanium halide and the fatty acid salt of magnesium, and the residual ingredient may be the titanium halide, the fatty acid salt of magnesium, or the electron donor compound respectively.

The copulverization in the first process provided according to the present invention is performed by use of a mill such as a ball mill or a vibrating mill at a temperature normally below 80° C., preferably in the range of from $-10° \sim 50°$ C.

The copulverization time in the first process provided according to the present invention is not specifically limited, but is generally in the range of from 10 minutes to 100 hours.

In the first process provided according to the present invention, the fatty acid salt of magnesium, the electron donor compound and the titanium halide may be brought into contact with each other in the presence of a solvent.

In the second process provided according to the present invention, both the method of contacting the ingredients and the temperature, at which the ingredients are brought into contact, are not specifically limited, but generally the ingredients are brought into contact with each other by use of a reactor fitted with a stirrer at a temperature of from room temperature to a temperature lower than the boiling points of both the titanium halide and the organic solvent. The contacting time therein is not specifically limited, but generally in the range of from one minute to 100 hours, preferably 10 minutes to 10 hours.

In the second process provided according to the present invention, the fatty acid salt of magnesium and the electron donor compound are brought into contact with each other in the presence of an organic solvent to form a mixed product, and to form a solid mixed product by removing the solvent from the mixed product thereafter. Therefore, the mixed product thus formed is essentially a suspension of the solid mixed product in the solvent.

In the first and third processes provided according to the present invention, the copulverization product or the mixed product formed by copulverizing or mixing the fatty acid salt of magnesium and the electron donor compound forms essentially a solid copulverization product or a solid mixed product.

The organic solvent used in the second process provided according to the present invention may be selected from any organic compounds which are liquid at 10° C. and atmospheric pressure, preferably from aliphatic and aromatic hydrocarbons having 5 to 10 carbon atoms. Specific examples of the organic solvents include n-pentane, n-hexane, n-heptane, benzene, toluene, and the like.

In the third process provided according to the present invention, generally the fatty acid salt of magnesium, the electron donor compound and the titanium halide are sufficiently brought into contact simply by mixing with each other by a suitable means such as stirring at a temperature in the range of from room temperature to a temperature lower than the boiling point of the titanium halide used, preferably 20° to 100° C., without needing to mix in the presence of any solvent or to copulverize the ingredients. The contacting time therein is not specifically limited so long as the fatty acid salt of magnesium, the electron donor compound and the titanium compound can be sufficiently reacted with each other, but is generally in the range of from 10 minutes to 10 hours. Thus, three ingredients as above can be brought into contact with each other by simple procedures under extremely mild conditions.

The solid copulverization product or the solid mixed product in the processes provided according to the present invention is brought into contact with the titanium halide by use of a reactor fitted with a stirrer generally at a temperature in the range of from room temperature to a temperature lower than the boiling point of titanium halide, preferably 20° to 100° C. The contacting time therein is not specifically limited so long as the solid copulverization product or the solid mixed product can sufficiently react with the titanium halide, but generally is in the range of from 10 minutes to 10 hours.

A final product obtained by the processes according to present invention as described above may be washed with an inert organic solvent, where washing is deemed to be completed when no halogen atom is detected in the solvent after washing. Consequently a resulting product thus washed is subjected to solid-liquid separation procedure for drying, or appropriate amount of inert organic solvent is further added to the resulting product to form a slurry so as to be used directly as the catalyst component for use in the polymerization of olefins according to the present invention.

All the procedures described above in the processes of the present invention are preferably conducted in the absence of oxygen, water, etc.

The catalyst component thus obtained is combined with an organo aluminium compound to form a catalyst for the polymerization of olefins. The organo aluminium compound is used in a molar ratio of from 1 to 1000, preferably 1 to 300 per atom of titanium in the catalyst component. In the polymerization of olefins, a third ingredient such as an electron donor compound may be added.

The polymerization of olefins may be performed in the presence of, or in the absence of an organic solvent, and olefin monomers may be used in the gaseous or liquid state.

The polymerization temperature is below 200° C., preferably below 100° C., and the polymerization pressure is below 100 kg/cm² gauge, preferably below 50 kg/cm2 gauge.

Examples of olefins homopolymerized or copolymerized by use of the catalyst component prepared by the process of the present invention include ethylene, propylene, 1-butene, 4-methyl-1-pentene, and the like.

The following Examples and Comparative Examples illustrate the present invention more in detail, but these Examples are not intended to limit it thereto.

EXAMPLE 1

(Preparation of catalyst component)

30 g of a pretreated magnesium stearate prepared by calcining commercially available magnesium stearate at 70° C. for 5 hours under vacuum and 6.3 g of ethyl benzoate are charged into a 1.2-liter vibrating mill pot, 3/5 the total volume of which is filled with a stainless ball having a diameter of 15 mm, in an atmosphere of nitrogen to be copulverized for treatment at room temperature for 20 hours at a number of vibration of 1460 v.p.m. and amplitude of vibration of 3.5 mm. To a 200 ml round flask fitted with a cooler and stirrer, the air in which is replaced by nitrogen, 50 ml of titanium tetrachloride and 10 g of the solid copulverization product are charged to be reacted with agitation at 65° C. for 2 hours. After the completion of the reaction, the reaction mixture is cooled down to room temperature. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 2.35% by weight.

Polymerization of propylene

To a 1.5 liter autoclave fitted with a stirrer, the air in which is thoroughly replaced by nitrogen, 500 ml of dehydrated n-heptane, 109 mg of triethyl aluminium, 0.92 mg as titanium of the catalyst component obtained as above and 35 mg of ethyl p-toluate are charged in an atmosphere of nitrogen. Thereafter the resulting mixture is heated to 60° C. and subjected to propylene polymerization under a pressure of 4 kg/cm² gauge for 2 hours introducing thereto propylene gas. After the completion of polymerization reaction, solid polymer thus obtained is collected by filtration and dried by heating at 80° C. under reduced pressure. On the other hand, the filtrate is thickened to obtain polymer soluble in a solvent used in polymerization.

The amount of the polymer soluble in the solvent used in polymerization is represented by (A), and the amount of the solid polymer obtained as above is represented by (B). The solid polymer is subjected to extraction with boiling n-heptane for 6 hours to obtain polymer insoluble in boiling n-heptane, the amount of which is represented by (C). The polymerization activity (D) per unit weight of the catalyst component is represented by the formula $$(D) = \frac{[(A) + (B)] \, (g)}{\text{amount of catalyst component (g)}}$$

and the yield (E) of crystalline polymer is represented by the formula $$(E) = \frac{(C)}{(B)} \times 100\%$$

Further, the overall yield (F) of crystalline polymer is represented by the formula $$(F) = \frac{(C)}{(A) + (B)} \times 100\%$$

The chlorine content in the produced polymer is represented by (G).

Results thus obtained are shown in Table-1.

EXAMPLE 2

The procedures of Example 1 for the preparation of the catalyst component are repeated except that the magnesium stearate is copulverized with ethyl benzoate for 40 hours to prepare a catalyst component. The titanium content in the solids separated is 2.42% by weight.

In the polymerization of propylene, the procedures of Example 1 are also repeated except that the catalyst component thus obtained is added in an amount of 0.88 mg as titanium. Results thus obtained are shown in Table-1.

COMPARATIVE EXAMPLE 1

14.2 g of anhydrous magnesium acetate, 40.8 g of aluminium triisopropoxide and 50 ml of decalin are charged into a 200 ml round flask in an atmosphere of nitrogen, and are mixed with agitation for 10 hours at a temperature of from 170° to 230° C. After removing the solvent, the resulting reaction mixture is dried under reduced pressure to obtain a crude solid powder. The crude solid powder thus obtained is washed with 100 ml of anhydrous n-heptane 10 times. Thereafter the solvent is removed from a solid powder thus washed, and the resulting solid powder is dried under reduced pressure to obtain a final solid powder, to which 80 ml of titanium tetrachloride is then added to be mixed with agitation for 2 hours at 150° C. After the completion of the reaction, the reaction mixture is cooled down to room temperature. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 12.2% by weight.

In the polymerization of propylene, the procedures of Example 1 are also repeated except that the catalyst component thus obtained is added in an amount of 1.35 mg as titanium. Results thus obtained are shown in Table-1. As apparent from the results shown in Table-1, the produced polymer is not obtained substantially in an amount enough to determine polymerization characteristics thereof.

EXAMPLE 3

The procedures of Example 1 for the preparation of the catalyst component are repeated except that the commercially available magnesium stearate is calcined at 110° C. for 5 hours under vacuum. The titanium content in the solids separated is 2.46% by weight.

In the polymerization of propylene, the procedures of Example 1 are also repeated except that 13.7 mg of triethyl aluminium and 1.18 mg as titanium of the catalyst component are employed, and that no ethyl p-toluate is employed. Results thus obtained are shown in Table-1.

EXAMPLE 4

The procedures of Example 3 for the preparation of the catalyst component are repeated except that the commercially available magnesium stearate is melted at above 130° C. and then quenched to be solidified. The titanium content in the solids separated is 2.53% by weight.

In the polymerization of propylene, the procedures of Example 3 are also repeated except that the catalyst component thus obtained is added in an amount of 1.09 mg as titanium. Results thus obtained are shown in Table-1.

EXAMPLE 5

The procedures of Example 3 for the preparation of the catalyst component are repeated except that the commercially available magnesium stearate is calcined with agitation at 110° C. for 5 hours under vacuum. The titanium content in the solids separated is 2.13% by weight.

EXAMPLE 6

The procedures of Example 3 are repeated except that 7.6 g of ethyl benzoate is added to prepare a catalyst component. The titanium content in the solids separated is 2.27% by weight.

In the polymerization of propylene, the procedures of Example 3 are also repeated except that the catalyst component thus obtained is added in an amount of 1.28 mg as titanium. Results thus obtained are shown in Table-1.

EXAMPLE 7

The procedures of Example 3 are repeated except that 5.3 g of ethyl benzoate is used to prepare a catalyst component. The titanium content in the solids separated is 2.28% by weight.

In the polymerization of propylene, the procedures of Example 3 are also repeated except that the catalyst component thus obtained is added in an amount of 1.10 mg as titanium. Results thus obtained are shown in Table-1.

EXAMPLE 8

The procedures of Example 6 are repeated except that a pretreated magnesium octanoate prepared by calcining a commercially available magnesium octanoate at 150° C. for 7 hours under vacuum is used in place of magnesium stearate to prepare a catalyst component. The titanium content in the solids separated is 2.54% by weight.

In the polymerization of propylene, the procedures of Example 3 are also repeated except that the catalyst component thus obtained is added in an amount of 1.20 mg as titanium. Results thus obtained are shown in Table-1.

EXAMPLE 9

The procedures of Example 3 are repeated except that a pretreated magnesium laurate prepared by calcining commercially available magnesium laurate at 50° C. for 5 hours under vacuum is used in place of magnesium stearate to prepare a catalyst component. The titanium content in the solids separated is 2.58% by weight.

In the polymerization of propylene, the procedures of Example 3 are also repeated except that the catalyst component thus obtained is added in an amount of 1.31 mg as titanium. Results thus obtained are shown in Table-1.

EXAMPLE 10

The procedures of Example 3 are repeated except that a pretreated magnesium decanoate prepared by calcining commercially available magnesium decanoate at 50° C. for 5 hours under vacuum is used in place of magnesium stearate to prepare a catalyst component. The titanium content in the solids separated is 2.31% by weight.

In the polymerization of propylene, the procedures of Example 3 are also repeated except that the catalyst component thus obtained is added in an amount of 1.34 mg as titanium. Results thus obtained are shown in Table-1.

EXAMPLE 11

The procedures of Example 4 are repeated except that the solid copulverization product is brought into contact with titanium tetrachloride at 55° C. to prepare a catalyst component. The titanium content in the solids separated is 2.32% by weight.

In the polymerization of propylene, the procedures of Example 3 are also repeated except that the catalyst component thus obtained is added in an amount of 1.07 mg as titanium. Results thus obtained are shown in Table-1.

EXAMPLE 12

The procedures of Example 4 are repeated except that the solid copulverization product is brought into contact with titanium tetrachloride at 75° C. to prepare a catalyst component. The titanium content in the solids separated is 2.22% by weight.

In the polymerization of propylene, the procedures of Example 3 are also repeated except that the catalyst component thus obtained is added in an amount of 1.12 mg as titanium. Results thus obtained are shown in Table-1.

EXAMPLE 13

The procedures of Example 4 are repeated except that the solid copulverization product is brought into contact with titanium tetrachloride for 3 hours to prepare a catalyst component. The titanium content in the solids separated is 2.46% by weight.

In the polymerization of propylene, the procedures of Example 3 are also repeated except that the catalyst component thus obtained is added in an amount of 1.03 mg as titanium. Results thus obtained are shown in Table-1.

EXAMPLE 14

The procedures of Example 8 are repeated except that 12.8 g of ethyl benzoate is used to prepare a catalyst component. The titanium content in the solids separated is 2.41% by weight.

In the polymerization of propylene, the procedures of Example 3 are also repeated except that the catalyst component thus obtained is added in an amount of 1.13 mg as titanium. Results thus obtained are shown in Table-1.

EXAMPLE 15

The procedures of Example 4 are repeated except that 7.6 g of ethyl p-anisate is used in place of ethyl benzoate to prepare a catalyst component. The titanium content in the solids separated is 2.61% by weight.

In the polymerization of propylene, the procedures of Example 3 are also repeated except that the catalyst component thus obtained is added in an amount of 0.98 mg as titanium. Results thus obtained are shown in Table-1.

EXAMPLE 16

The procedures of Example 4 are repeated except that 6.9 g of ethyl p-toluate is used in place of ethyl benzoate to prepare a catalyst component. The titanium content in the solids separated is 2.72% by weight.

In the polymerization of propylene, the procedures of Example 3 are also repeated except that the catalyst component thus obtained is added in an amount of 0.89 mg as titanium. Results thus obtained are shown in Table-1.

EXAMPLE 17

The procedures of Example 4 are repeated except that the magnesium stearate is copulverized with ethyl benzoate at about 0° C. to prepare a catalyst component. The titanium content in the solids separated is 2.21% by weight.

In the polymerization of propylene, the procedures of Example 3 are also repeated except that the catalyst component thus obtained is added in an amount of 1.20 mg as titanium. Results thus obtained are shown in Table-1.

COMPARATIVE EXAMPLE 2

The procedures of Example 1 are repeated except that 30 g of commercially available anhydrous magnesium chloride in place of the pretreated magnesium stearate and 9.5 g of ethyl benzoate are used to prepare a catalyst component. The titanium content in the solids separated is 1.30% by weight.

In the polymerization of propylene, the procedures of Example 3 are also repeated except that the catalyst component thus obtained is added in an amount of 0.68 mg as titanium. Results thus obtained are shown in Table-1.

EXAMPLE 18

(Preparation of catalyst component)

25 g of a pretreated magnesium stearate prepared by calcining commercially available magnesium stearate at 110° C. for 7 hours under vacuum, 6.3 g of ethyl benzoate and 10.4 g of titanium tetrachloride are charged into a 1-liter vibrating mill pot, 3/5 the total volume of which is filled with a stainless ball having a diameter of 15 mm, in an atmosphere of nitrogen to be copulverized for treatment at room temperature for 20 hours at a number of vibration of 1460 v.p.m. and amplitude of vibration of 3.5 mm. To a 200 ml round flask fitted with a cooler and stirrer, the air in which is replaced by nitrogen, 10 g of the copulverization product is charged to be washed with 100 ml of dehydrated n-heptane repeating until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.82% by weight.

Polymerization of propylene

To a 1.5 liter autoclave fitted with a stirrer, the air in which is thoroughly replaced by nitrogen, 500 ml of dehydrated n-heptane, 27.3 mg of triethyl aluminium, and 2.28 mg as titanium of the catalyst component obtained as above are charged in an atmosphere of nitrogen. Thereafter the resulting mixture is heated to 60° C. and subjected to propylene polymerization under a pressure of 4 kg/cm$^2$ gauge for 2 hours introducing thereto propylene gas. After the completion of polymerization reaction, solid polymer thus obtained is collected by filtration and dried by heating at 80° C. under reduced pressure. On the other hand, the filtrate is thickened to obtain polymer soluble in a solvent used in polymerization. Results thus obtained are shown in Table-1.

EXAMPLE 19

(Preparation of catalyst component)

25 g of a pretreated magnesium stearate prepared by calcining commercially available magnesium stearate at 110° C. for 7 hours under vacuum and 10.4 g of titanium tetrachloride are charged into a 1.2-liter vibrating mill pot, 3/5 the total volume of which is filled with a stainless ball having a diameter of 15 mm, in an atmosphere of nitrogen to be copulverized for treatment at room temperature for 20 hours at a number of vibration of 1460 v.p.m. and amplitude of vibration of 3.5 mm. To a 200 ml round flask fitted with a cooler and stirrer, the air in which is replaced by nitrogen, 10 g of the copulverization product, 1.68 g of ethyl benzoate and 50 ml of toluene are charged to be reacted with agitation at 65° C. for 2 hours. After the completion of the reaction, the reaction mixture is cooled down to room temperature. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 3.61% by weight.

In the polymerization of propylene, the procedures of Example 18 are also repeated.

Results thus obtained are shown in Table-1.

EXAMPLE 20

The procedures of Example 18 are repeated except that the copulverization temperature is 0° C. to prepare a catalyst component. The titanium content in the solids separated is 2.85% by weight.

In the polymerization of propylene, the procedures of Example 18 are also repeated.

Results thus obtained are shown in Table-1.

EXAMPLE 21

The procedures of Example 18 are repeated except that 25 g of a pretreated magnesium octanoate prepared by calcining commercially available magnesium octoate at 70° C. for 7 hours under vacuum is used to prepare a catalyst component. The titanium content in the solids separated is 3.50% by weight.

In the polymerization of propylene, the procedures of Example 18 are also repeated.

Results thus obtained are shown in Table-1.

TABLE 1

| Examples | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 |
|---|---|---|---|---|---|---|---|---|---|---|---|---|
| Amount of polymer soluble in the solvent used in polymerization (A) g | 4 | 4 | 4 | 4 | 6 | 4 | 6 | 5 | 5 | 5 | 5 | 5 |
| Amount of solid polymer (B) g | 129 | 133 | 159 | 185 | 248 | 193 | 226 | 175 | 184 | 198 | 189 | 197 |
| Amount of polymer insoluble in boiling n-heptane (C) g | 127 | 131 | 153 | 178 | 241 | 185 | 217 | 168 | 177 | 190 | 183 | 190 |
| Polymerization activity per unit weight of catalyst component (D) | 3,400 | 3,800 | 3,400 | 4,400 | 4,100 | 3,500 | 4,800 | 3,800 | 3,700 | 3,500 | 4,200 | 4,000 |
| Yield of crystalline polymer (E) (%) | 98.8 | 98.5 | 96.1 | 96.4 | 97.0 | 96.0 | 95.9 | 96.2 | 96.0 | 96.0 | 96.8 | 96.5 |
| Overall yield of crystalline polymer (F) (%) | 95.8 | 95.6 | 93.8 | 94.1 | 94.8 | 94.1 | 93.5 | 93.5 | 93.6 | 93.7 | 94.4 | 94.2 |
| Chlorine content in the produced polymer (G) ppm | 147 | 132 | 147 | 114 | 122 | 143 | 104 | 132 | 135 | 143 | 119 | 125 |

| Examples | Ex. 13 | Ex. 14 | Ex. 15 | Ex. 16 | Ex. 17 | Ex. 18 | Ex. 19 | Ex. 20 | Ex. 21 | Com. Ex. 1 | Com. Ex. 2 |
|---|---|---|---|---|---|---|---|---|---|---|---|
| Amount of polymer soluble in the solvent used in polymerization (A) g | 5 | 4 | 4 | 3 | 6 | 5.2 | 6.3 | 7.8 | 5.3 | — | 4 |
| Amount of solid polymer (B) g | 192 | 160 | 169 | 154 | 211 | 181 | 190 | 256 | 191 | 2 | 148 |
| Amount of polymer insoluble in boiling n-heptane (C) g | 186 | 155 | 163 | 148 | 205 | 174 | 183 | 246 | 183 | — | 141 |
| Polymerization activity | 4,700 | 3,500 | 4,600 | 4,800 | 4,000 | 3,120 | 3,110 | 3,300 | 3,015 | — | 2,900 |

TABLE 1-continued

| | | | | | | | | | | | |
|---|---|---|---|---|---|---|---|---|---|---|---|
| per unit weight of catalyst component (D) | | | | | | | | | | | |
| Yield of crystalline polymer (E) (%) | 96.7 | 96.9 | 96.3 | 96.1 | 97.0 | 96.1 | 96.3 | 96.1 | 95.8 | — | 95.5 |
| Overall yield of crystalline polymer (F) (%) | 94.3 | 94.5 | 94.3 | 94.1 | 94.4 | 93.4 | 93.2 | 93.3 | 93.2 | — | 93.0 |
| Chlorine content in the produced polymer (G) ppm | 106 | 143 | 109 | 104 | 125 | 163 | 164 | 155 | 169 | — | 228 |

EXAMPLE 22

(Preparation of catalyst component)

60 g of a pretreated magnesium stearate prepared by calcining commercially available magnesium stearate at 110° C. for 7 hours under vacuum, 15.8 g of ethyl benzoate and 135 ml of n-heptane are charged into a 300 ml glass reactor in an atmosphere of nitrogen, and mixed with agitation for one hour at room temperature followed by drying under reduced pressure to obtain a solid mixed product. To a 200 ml round flask fitted with a cooler and stirrer, the air in which is replaced by nitrogen, 50 ml of titanium tetrachloride and 10 g of the solid mixed product are charged to be reacted with agitation at 65° C. for 2 hours. After the completion of the reaction, the reaction mixture is cooled down to 45° C. and left at rest for removing the resulting supernatant liquid by decanting. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 2.64% by weight.

Polymerization of propylene

To a 1.5 liter autoclave fitted with a stirrer, the air in which is thoroughly replaced by nitrogen, 500 ml of dehydrated n-heptane, 13.6 mg of triethyl aluminium, and 1.41 mg as titanium of the catalyst component obtained as above are charged in an atmosphere of nitrogen. Thereafter the resulting mixture is heated to 60° C. and subjected to propylene polymerization under a pressure of 4 kg/cm² gauge for 2 hours introducing thereto propylene gas. After the completion of polymerization reaction, solid polymer thus obtained is collected by filtration and dried by heating at 80° C. under reduced pressure.

The results thus obtained are shown in Table-2.

EXAMPLE 23

The procedures of Example 22 are repeated except that 108.8 mg of triethyl aluminium, 44.8 mg of ethyl p-toluate and 1.13 mg as titanium of the catalyst component thus obtained are charged thereinto in the polymerization of propylene. The results thus obtained are shown in Table-2.

EXAMPLE 24

20 g of a pretreated magnesium stearate prepared by calcining commercially available magnesium stearate at 110° C. for 7 hours under vacuum, 3.3 g of ethyl benzoate and 47 ml of n-pentane are charged into a 300 ml glass reactor in an atmosphere of nitrogen to be mixed with agitation for one hour at room temperature, and then heated at 40° C. to remove the solvent, obtaining a solid mixed product. To a 200 ml round flask fitted with a cooler and stirrer, the air in which is replaced by nitrogen, 50 ml of titanium tetrachloride and 10 g of the solid mixed product are charged to be reacted with agitation at 65° C. for 2 hours. After the completion of the reaction, the reaction mixture is cooled down to 45° C. and left at rest for removing the resulting supernatant liquid by decanting. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 2.37% by weight.

In the polymerization of propylene, the procedures of Example 22 are repeated.

Results thus obtained are shown in Table-2.

EXAMPLE 25

The procedures of Example 22 are repeated except that the solid mixed product is reacted with titanium tetrachloride at 50° C. The titanium content in the solids separated is 2.32% by weight. Results thus obtained are shown in Table-2.

EXAMPLE 26

The procedures of Example 22 are repeated except that the solid mixed product is reacted with titanium tetrachloride at 80° C. The titanium content in the solids separated is 2.47% by weight. Results thus obtained are shown in Table-2.

EXAMPLE 27

The procedures of Example 22 are repeated except that 30 g of the pretreated magnesium stearate, 5.7 g of ethyl benzoate and 70 ml of n-heptane are used to prepare a catalyst component. The titanium content in the solids separated is 2.44% by weight. Results thus obtained are shown in Table-2.

EXAMPLE 28

The procedures of Example 22 are repeated except that 20 g of a pretreated magnesium octanoate prepared by calcining commercially available magnesium octanoate at 70° C. for 7 hours under vacuum, 7.5 g of ethyl benzoate and 45 ml of n-heptane are used to prepare a catalyst component. The titanium content in the solids separated is 2.63% by weight.

In the polymerization of propylene, the procedures of Example 22 are also repeated except that 108.8 mg of triethyl aluminium, 39.2 mg of ethyl p-toluate and 0.91 mg as titanium of the catalyst component are added thereto. Results thus obtained are shown in Table-2.

EXAMPLE 29

(Preparation of catalyst component)

10 g of a pretreated magnesium stearate prepared by calcining commercially available magnesium stearate at 110° C. for 7 hours under vacuum, 1.6 ml of ethyl benzoate, 30 ml of titanium tetrachloride and 20 ml of toluene are charged into a 200 ml glass reactor in an atmosphere of nitrogen to be reacted with agitation at 65° C. for 2 hours. After the completion of the reaction, the reaction mixture is cooled down to 45° C. and left at rest for removing the resulting supernatant liquid by decanting. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 2.82% by weight.

Polymerization of propylene

To a 1.5 liter autoclave fitted with a stirrer, the air in which is thoroughly replaced by nitrogen, 500 ml of dehydrated n-heptane, 13.6 mg of triethyl aluminium, and 1.14 mg as titanium of the catalyst component obtained as above are charged in an atmosphere of nitrogen. Thereafter the resulting mixture is heated to 60° C. and subjected to propylene polymerization under a pressure of 4 kg/cm² gauge for 2 hours introducing thereto propylene gas. After the completion of polymerization reaction, solid polymer thus obtained is collected by filtration and dried by heating at 80° C. under reduced pressure.

The results thus obtained are shown in Table-2.

EXAMPLE 30

The procedures of Example 29 are repeated except that 2.0 ml of ethyl benzoate is used to prepare a catalyst component. The titanium content in the solids thus separated is 2.42% by weight.

In the polymerization of propylene, the procedures of Example 29 are repeated. Results thus obtained are shown in Table-2.

EXAMPLE 31

The procedures of Example 29 are repeated except that the reaction temperature is 75° C. to obtain a catalyst component. The titanium content in the solids thus separated is 2.79% by weight.

In the polymerization of propylene, the procedures of Example 29 are repeated. Results thus obtained are shown in Table-2.

EXAMPLE 32

The procedures of Example 29 are repeated except that 10 g of a pretreated magnesium octanoate prepared by calcining commercially available magnesium octanoate at 70° C. for 7 hours under vacuum is used to obtain a catalyst component. The titanium content in the solids thus separated is 2.71% by weight.

In the polymerization of propylene, the procedures of Example 29 are repeated. Results thus obtained are shown in Table-2.

TABLE 2

| Examples | 22 | 23 | 24 | 25 | 26 | 27 | 28 | 29 | 30 | 31 | 32 |
|---|---|---|---|---|---|---|---|---|---|---|---|
| Amount of polymer soluble in the solvent used in polymerization (A) g | 4.0 | 1.6 | 5.7 | 5.5 | 5.8 | 4.6 | 3.9 | 3.0 | 3.0 | 3.9 | 2.8 |
| Amount of solid polymer (B) g | 165 | 135 | 280 | 181 | 226 | 169 | 145 | 130 | 143 | 125 | 131 |
| Amount of polymer insoluble in boiling n-heptane (C) g | 158.5 | 131 | 268 | 174 | 218 | 162 | 140 | 124 | 136 | 120 | 125 |
| Polymerization activity per unit weight of catalyst component (D) | 3,164 | 3,191 | 4,802 | 3,069 | 4,061 | 3,004 | 4,303 | 3,290 | 3,100 | 3,150 | 3,180 |
| Yield of crystalline polymer (E) (%) | 96.1 | 97.0 | 95.6 | 96.1 | 96.5 | 95.9 | 96.5 | 95.4 | 95.1 | 96.0 | 95.4 |
| Overall yield of crystalline polymer (F) (%) | 93.8 | 95.9 | 93.8 | 93.3 | 94.0 | 93.3 | 94.0 | 93.2 | 93.2 | 93.1 | 93.4 |
| Chlorine content in the produced polymer (G) ppm | 158 | 157 | 104 | 163 | 123 | 166 | 118 | 155 | 165 | 162 | 160 |

EXAMPLE 33

(Preparation of catalyst component)

10 g of a pretreated magnesium stearate prepared by calcining commercially available magnesium stearate at 110° C. for 7 hours under vacuum, 1.6 ml of ethyl benzoate and 50 ml of titanium tetrachloride are charged into a 200 ml round flask fitted with a stirrer, the air in which is replaced by nitrogen, to be reacted at 65° C. for 2 hours. Thereafter, the resulting supernatant liquid is removed by decanting. A washing procedure with 100 ml of dehydrated n-heptane is repeated until no chlorine is detected in the n-heptane after washing to complete the washing procedure and to obtain a catalyst component. The catalyst component thus obtained is subjected to solid-liquid separation procedure with the result that the titanium content in the solids thus separated is measured to be 2.42% by weight.

Polymerization of propylene

To a 1.5 liter autoclave fitted with a stirrer, the air in which is thoroughly replaced by nitrogen, 500 ml of dehydrated n-heptane, 13.6 mg of triethyl aluminium, and 1.14 mg as titanium of the catalyst component obtained as above are charged in an atmosphere of nitrogen. Thereafter the resulting mixture is heated to 60° C. and subjected to propylene polymerization under a pressure of 4 kg/cm$^2$ gauge for 2 hours introducing thereto propylene gas. After the completion of polymerization reaction, solid polymer thus obtained is collected by filtration and dried by heating at 80° C. under reduced pressure.

Results thus obtained are shown in Table-3.

EXAMPLE 34

The procedures of Example 33 are repeated except that 1.3 ml of ethyl benzoate is used to prepare a catalyst component. The titanium content in the solids thus separated is 2.62% by weight.

In the polymerization of propylene, the procedures of Example 33 are repeated except that 108.8 mg of triethyl aluminium, 44.9 mg of ethyl p-toluate and 0.92 mg as titanium of the catalyst component are used.

Results thus obtained are shown in Table-3.

EXAMPLE 35

The procedures of Example 33 are repeated except that 1.0 ml of ethyl benzoate is used to prepare a catalyst component. The titanium content in the solids thus separated is 2.57% by weight.

In the polymerization of propylene, the procedures of Example 33 are repeated except that 108.8 mg of triethyl aluminium, 44.9 mg of ethyl p-toluate and 0.91 mg as titanium of the catalyst component are used.

Results thus obtained are shown in Table-3.

EXAMPLE 36

The procedures of Example 33 are repeated except that 10 g of a pretreated magnesium octanoate prepared by calcining commercially available magnesium octanoate at 70° C. for 7 hours under vacuum to prepare a catalyst component. The titanium content in the solids thus separated is 2.88% by weight.

In the polymerization of propylene, the procedures of Example 33 are also repeated except that 108.8 mg of triethyl aluminium, 52.3 mg of ethyl p-toluate and 0.91 mg as titanium of the catalyst component are used.

Results thus obtained are shown in Table-3.

EXAMPLE 37

The procedures of Example 33 are repeated except that 10 g of a pretreated magnesium laurate is used to prepare a catalyst component. The titanium component in the solids thus separated is 2.21% by weight.

In the polymerization of propylene, the procedures of Example 33 are repeated except that 54.4 mg of triethyl aluminium, 22.5 mg of ethyl p-toluate and 0.45 mg as titanium of the catalyst component are used.

Results thus obtained are shown in Table-3.

EXAMPLE 38

The procedures of Example 33 are repeated except that 10 g of a pretreated magnesium decanoate prepared by calcining commercially available magnesium decanoate at 70° C. for 7 hours under vacuum is used to prepare a catalyst component. The titanium content in the solids thus separated is 2.22% by weight.

In the polymerization of propylene, the procedures of Example 33 are also repeated except that 108.8 mg of triethyl aluminium, 52.3 mg of ethyl p-toluate and 0.91 mg as titanium of the catalyst component are used.

Results thus obtained are shown in Table-3.

EXAMPLE 39

The procedures of Example 33 are repeated except that 10 g of a pretreated magnesium stearate prepared by calcining commercially available magnesium stearate at 110° C. for 7 hours under vacuum is charged into a 200 ml round flask fitted with a stirrer, the air in which is thoroughly replaced by nitrogen. Thereafter 1.6 ml of ethyl benzoate is added thereto and mixed with agitation for 30 minutes at room temperature followed by adding 50 ml of titanium tetrachloride to be reacted with agitation at 65° C. for 2 hours for preparing a catalyst component. The titanium content in the solids thus separated is 2.38% by weight.

In the polymerization of propylene, the procedures of Example 33 is also repeated.

Results thus obtained are shown in Table-3.

EXAMPLE 40

The procedures of Example 33 are repeated except that 1.6 ml of ethyl benzoate is charged into a 200 ml round flask fitted with a stirrer, the air in which is thoroughly replaced by nitrogen. Thereafter 50 ml of titanium tetrachloride is added thereto and mixed with agitation for 30 minutes at room temperature followed by adding a pretreated magnesium stearate prepared by calcining commercially available magnesium stearate at 110° C. for 7 hours under vacuum to be reacted with agitation at 65° C. for 2 hours for preparing a catalyst component. The titanium content in the solids thus separated is 2.39% by weight.

In the polymerization of propylene, the procedures of Example 33 are also repeated.

Results thus obtained are shown in Table-3.

EXAMPLE 41

The procedures of Example 33 are repeated except that 50 ml of titanium tetrachloride is charged into a 200 ml round flask fitted with a stirrer, the air in which is thoroughly replaced by nitrogen. Thereafter 10 g of a pretreated magnesium stearate prepared by calcining commercially available magnesium stearate at 110° C. for 7 hours under vacuum is added thereto and mixed with agitation for 30 minutes at room temperature followed by adding 1.6 ml of ethyl benzoate to be reacted with agitation at 65° C. for 2 hours for preparing a catalyst component. The titanium content in the solids thus separated is 2.36% by weight.

In the polymerization of propylene, the procedures of Example 33 are also repeated. Results thus obtained are shown in Table-3.

TABLE 3

| Examples | 33 | 34 | 35 | 36 | 37 | 38 | 39 | 40 | 41 |
|---|---|---|---|---|---|---|---|---|---|
| Amount of polymer | 2.6 | 4.4 | 2.7 | 2.4 | 2.2 | 1.5 | 2.8 | 3.0 | 2.7 |

TABLE 3-continued

| Examples | 33 | 34 | 35 | 36 | 37 | 38 | 39 | 40 | 41 |
|---|---|---|---|---|---|---|---|---|---|
| soluble in the solvent used in polymerization (A) g | | | | | | | | | |
| Amount of solid polymer (B) g | 145 | 206 | 203 | 126 | 95 | 131 | 148 | 150 | 146 |
| Amount of polymer insoluble in boiling n-heptane (C) g | 140 | 196 | 191 | 122 | 92 | 127 | 143 | 145 | 141 |
| Polymerization activity per unit weight of catalyst component (D) | 3,119 | 6,013 | 5,775 | 4,042 | 4,730 | 3,230 | 3,148 | 3,208 | 3,079 |
| Yield of crystalline polymer (E) (%) | 96.7 | 95.0 | 94.2 | 96.5 | 96.5 | 97.2 | 96.6 | 96.7 | 96.6 |
| Overall yield of crystalline polymer (F) (%) | 94.9 | 93.0 | 93.0 | 94.7 | 94.3 | 96.1 | 95.0 | 94.8 | 94.7 |
| Chlorine content in the produced polymer (G) ppm | 160 | 83 | 87 | 126 | 108 | 158 | 159 | 156 | 162 |

What is claimed is:

1. A process for the preparation of catalyst component for the polymerization of olefins which comprises contacting with each other (a) a fatty acid salt of magnesium, (b) an electron donor compound and (c) a titanium halide of the general formula: $TiX_4$, wherein X represents a halogen atom, said three ingredients (a), (b) and (c) being copulverized simultaneously in the absence of any solvent, or said fatty acid salt of magnesium being copulverized with said electron donor compound or with said titanium halide in the absence of any solvent to form a copulverization product, said copulverization product then being brought into contact with said titanium halide or with said electron donor compound respectively, said copulverization product formed by the copulverization of the fatty acid salt of magnesium with the electron donor compound forming essentially a solid copulverization product.

2. A process for the preparation of catalyst component for the polymerization of olefins which comprises contacting (a) a fatty acid salt of magnesium, (b) an electron donor compound and (c) a titanium halide of the general formula: $TiX_4$, wherein X represents a halogen atom, said three ingredients (a), (b) and (c) being mixed simultaneously in the presence of an organic solvent, or any two ingredients selected from said three ingredients (a), (b) and (c) being mixed with each other in the presence of an organic solvent to form a mixed product, said mixed product then being mixed directly or after removing the solvent therefrom with the residual ingredient, said mixed product formed by mixing the fatty acid salt of magnesium with the electron donor compound forming essentially a solid mixed product by removing the solvent therefrom or forming essentially a suspension.

3. A process for the preparation of catalyst component for the polymerization of olefins which comprises contacting (a) a fatty-acid salt of magnesium, (b) an electron donor compound and (c) a titanium halide of the general formula: $TiX_4$, wherein X represents a halogen atom, said three ingredients (a), (b) and (c) being mixed simultaneously in the absence of any solvent, or any two ingredients selected from said three ingredients (a), (b) and (c) being mixed with each other in the absence of any solvent to form a mixed product, said mixed product then being mixed with the residual ingredient, said mixed product formed by mixing the fatty acid salt of magnesium with the electron donor compound forming essentially a solid mixed product.

4. A process as claimed in claim 1, 2 or 3, wherein said fatty acid salt of magnesium is saturated fatty acid salt of magnesium.

5. A process as claimed in claim 4, wherein said saturated fatty acid salt of magnesium is selected from magnesium stearate, magnesium octanoate, magnesium decanoate and magnesium laurate.

6. A process as claimed in claim 1, 2 or 3, wherein said electron donor compound is aromatic carboxylic acid esters.

7. A process as claimed in claim 6, wherein said aromatic carboxylic acid esters are selected from ethyl benzoate, ethyl p-anisate and ethyl p-toluate.

8. A process as claimed in claim 1, 2 or 3, wherein said titanium halide is titanium tetrachloride.

9. A process as claimed in claim 1, 2 or 3, wherein said electron donor compound is used in an amount of from 0.1 to 5 moles per one mole of said fatty acid salt of magnesium.

10. A process as claimed in claim 9, wherein said electron donor compound is used in an amount of from 0.3 to 2 moles per one mole of said fatty acid salt of magnesium.

11. A process as claimed in claim 1, 2 or 3, wherein said titanium halide is used in an amount more than 0.01 mole per one mole of said fatty acid salt of magnesium.

12. A process as claimed in claim 11, wherein said titanium halide is used in an amount more than one mole per one mole of said fatty acid salt of magnesium.

13. A process as claimed in claim 1, wherein copulverization is carried out at a temperature lower than 80° C. for a period of time in the range of from 10 minutes to 100 hours.

14. A process as claimed in claim 13, wherein copulverization is carried out at a temperature in the range of from −10° to 50° C.

15. A process as claimed in claim 1, wherein said solid copulverization product is brought into contact with the titanium halide at a temperature in the range of from room temperature to a temperature lower than the boiling point of titanium halide used for a period of time in the range of from 10 minutes to 10 hours.

16. A process as claimed in claim 15, wherein said solid copulverization product is brought into contact with the titanium halide at a temperature of from 20° to 100° C.

17. A process as claimed in claim 2 or 3, wherein said two ingredients selected are the fatty acid salt of magnesium and the electron donor compound, and the residual ingredient is the titanium halide.

18. A process as claimed in claim 2 or 3, wherein said two ingredients selected are the electron donor compound and the titanium halide, and the residual ingredient is the fatty acid salt of magnesium.

19. A process as claimed in claim 2 or 3, wherein said two ingredients selected are the titanium halide and the fatty acid salt of magnesium, and the residual ingredient is the electron donor compound.

20. A process as claimed in claim 2, wherein mixing in the presence of the organic solvent is conducted at a temperature in the range of from room temperature to a temperature lower than the boiling points of both the titanium halide and the organic solvent for a period of time in the range of from 10 minutes to 10 hours.

21. A process as claimed in claim 2, wherein said solid mixed product is brought into contact with the titanium halide at a temperature in the range of from room temperature to a temperature lower than the boiling point of the titanium halide for a period of time in the range of from 10 minutes to 10 hours.

22. A process as claimed in claim 2, wherein said organic solvent is selected from any organic compounds which are liquid at 10° C. under atmospheric pressure.

23. A process as claimed in claim 22, wherein said organic solvent is selected from n-pentane, n-hexane, n-heptane, benzene, and toluene.

24. A process as claimed in claim 3, wherein said solid mixed product is brought into contact with the titanium halide at a temperature in the range of from room temperature to a temperature lower than the boiling point of titanium halide for a period of time in the range of from 10 minutes to 10 hours.

25. A process as claimed in claim 24, wherein said solid mixed product is brought into contact with the titanium halide at a temperature of from 20° to 100° C.

* * * * *